US012783089B2

(12) United States Patent
Lee

(10) Patent No.: US 12,783,089 B2
(45) Date of Patent: Nov. 3, 2026

(54) INTERFERENCE AVOIDANCE IN A TOUCH SENSOR BY ADJUSTING SCAN ORDER

(71) Applicant: Synaptics Incorporated, San Jose, CA (US)

(72) Inventor: Sung-Sool Lee, Gangnam-gu (KR)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 19/228,889

(22) Filed: Jun. 5, 2025

(65) Prior Publication Data

US 2026/0010262 A1 Jan. 8, 2026

Related U.S. Application Data

(60) Provisional application No. 63/667,553, filed on Jul. 3, 2024.

(51) Int. Cl.

| | |
|---|---|
| ***G06F 3/041*** | (2006.01) |
| ***G06F 3/044*** | (2006.01) |
| ***G09G 3/20*** | (2006.01) |

(52) U.S. Cl.
CPC ...... *G06F 3/04182* (2019.05); *G06F 3/04162* (2019.05); *G06F 3/0441* (2019.05);
(Continued)

(58) Field of Classification Search
CPC ....... G06F 2203/04106; G06F 3/04182; G06F 3/04162; G06F 3/0441; G06F 3/04184;
(Continued)

(56) References Cited

U.S. PATENT DOCUMENTS 8,519,940 B2 * 8/2013 Yeo ...................... G09G 3/3406 345/208
11,216,129 B2 * 1/2022 Choi .................. G06F 3/04184
(Continued)

FOREIGN PATENT DOCUMENTS

| | | | |
|---|---|---|---|
| KR | 1020170069578 | A | 6/2017 |
| WO | 2024066834 | A1 | 4/2024 |

OTHER PUBLICATIONS

International Search Report, dated Oct. 30, 2025 in international application PCT/US2025/035619, filed Jun. 27, 2025.

*Primary Examiner* — Ricardo Osorio
(74) *Attorney, Agent, or Firm* — Leydig, Voit & Mayer, Ltd.

(57) ABSTRACT

An input device with a display configured to display frames according to a vertical synchronization (Vsync) signal, a plurality of sensor electrodes, and a touch controller are provided. The touch controller is configured to drive a first subset of the plurality of sensor electrodes for sensing in a plurality of sequences. A default sequence includes a first sensing mode and a second sensing mode wherein the first sensing mode precedes the second sensing mode. In a modified sequence, the second sensing mode precedes the second sensing mode. The touch controller monitors timing of the Vsync signal and determines whether communication with a system component will interfere with one of the first sensing mode or the second sensing mode based on the timing of the Vsync signal. The touch controller drives the sensor electrodes in the default sequence or the modified sequence based on the determination. The touch controller also receives resulting signals from a second subset of the plurality of sensor electrodes.

20 Claims, 6 Drawing Sheets

(52) U.S. Cl.
CPC . *G09G 3/2096* (2013.01); *G06F 2203/04106* (2013.01); *G09G 2310/08* (2013.01); *G09G 2354/00* (2013.01)

(58) Field of Classification Search
CPC ... G06F 3/0442; G06F 3/0446; G09G 3/2096; G09G 2310/08; G09G 2354/00
See application file for complete search history.

(56) References Cited

U.S. PATENT DOCUMENTS

| | | | | |
|---|---|---|---|---|
| 11,861,105 | B2 * | 1/2024 | Kim | G06F 3/0412 |
| 2017/0115803 | A1 * | 4/2017 | Seo | G06F 3/0412 |
| 2017/0168642 | A1 | 6/2017 | Lee | |
| 2017/0285771 | A1 | 10/2017 | Jung et al. | |
| 2017/0364184 | A1 * | 12/2017 | Weinerth | G06F 3/0446 |
| 2020/0272329 | A1 * | 8/2020 | Tang | G06F 3/04166 |
| 2022/0276745 | A1 * | 9/2022 | Kim | G06F 3/04186 |
| 2023/0343274 | A1 * | 10/2023 | Wu | G06F 3/1423 |
| 2025/0156008 | A1 * | 5/2025 | Kim | G06F 3/041661 |
| 2025/0208732 | A1 * | 6/2025 | Kim | G06F 3/041662 |
| 2025/0285602 | A1 * | 9/2025 | Cai | G09G 5/18 |

* cited by examiner

INTERFERENCE AVOIDANCE IN A TOUCH SENSOR BY ADJUSTING SCAN ORDER

CROSS REFERENCE TO RELATED APPLICATIONS

This application claims the benefit of U.S. Provisional Application Ser. No. 63/667,553, entitled "INTERFERENCE AVOIDANCE BY ADJUSTING SCAN ORDER BASED ON DISTANCE FROM VSYNC SIGNAL," filed on Jul. 3, 2024, the disclosure of which is expressly incorporated by reference in its entirety.

TECHNICAL FIELD

The disclosed technology generally relates to devices and methods for avoiding interference in a touch sensor.

BACKGROUND

Electronic devices adapted to display images and sense input objects (e.g., touch by a user) are widely used in electronic systems. An electronic device may include a display panel and an array of sensor electrodes disposed proximate to, or integrated in, the display panel. The electronic device may be configured to display an image on the display panel while sensing one or more input objects located on or near the display panel based on resulting signals received from the sensor electrodes.

An electronic device may also communicate with various devices, for example, detect and track an active pen in a sensing region of the electronic device. Such communication may interfere with sensing signals and hence the ability to sense input objects.

SUMMARY

In an exemplary embodiment, a touch sensor having a sensing region is provided. The touch sensor includes a plurality of sensor electrodes and a touch controller. The touch controller is configured to drive a first subset of the plurality of sensor electrodes for sensing in a plurality of sequences. The plurality of sequences include a default sequence with a first sensing mode and a second sensing mode where the first sensing mode precedes the second sensing mode. The plurality of sequences also include a modified sequence with the first sensing mode and the second sensing mode, where the second sensing mode precedes the first sensing mode. The touch controller is further configured to monitor timing of a vertical synchronization (Vsync) signal, determine that communication with a system component interferes with one of the first sensing mode or the second sensing mode based on the timing of the Vsync signal, drive the sensor electrodes in the modified sequence based on the determination that the communication with the system component interferes with one of the first sensing mode or the second sensing mode, and receive resulting signals from a second subset of the plurality of sensor electrodes.

In another exemplary embodiment, an input device is provided. The input device includes a display configured to display frames according to a vertical synchronization (Vsync) signal, a plurality of sensor electrodes, and a touch controller. The touch controller is configured to drive a first subset of the plurality of sensor electrodes for sensing in a plurality of sequences. The plurality of sequences include a default sequence with a first sensing mode and a second sensing mode, where the first sensing mode precedes the second sensing mode. The plurality of sequences also include a modified sequence with the first sensing mode and the second sensing mode, where the second sensing mode precedes the first sensing mode. The touch controller is further configured to monitor timing of the Vsync signal, determine that communication with a system component interferes with one of the first sensing mode or the second sensing mode based on the timing of the Vsync signal, drive the sensor electrodes in the modified sequence based on the determination that the communication with the system component interferes with one of the first sensing mode or the second sensing mode, and receive resulting signals from a second subset of the plurality of sensor electrodes.

In yet another exemplary embodiment, a method for capacitive sensing is provided. The method includes driving a first subset of sensor electrodes for sensing in a plurality of sequences. The plurality of sequences include a default sequence with a first sensing mode and a second sensing mode, where the first sensing mode precedes the second sensing mode, and a modified sequence with the first sensing mode and the second sensing mode, where the second sensing mode precedes the first sensing mode. The method further includes monitoring timing of a vertical synchronization (Vsync) signal, determining that communication with a system component interferes with one of the first sensing mode or the second sensing mode based on the timing of the Vsync signal, driving the sensor electrodes in the modified sequence based on the determination that the communication with the system component interferes with one of the first sensing mode or the second sensing mode, and receiving resulting signals from a second subset of electrodes.

Figure 1:
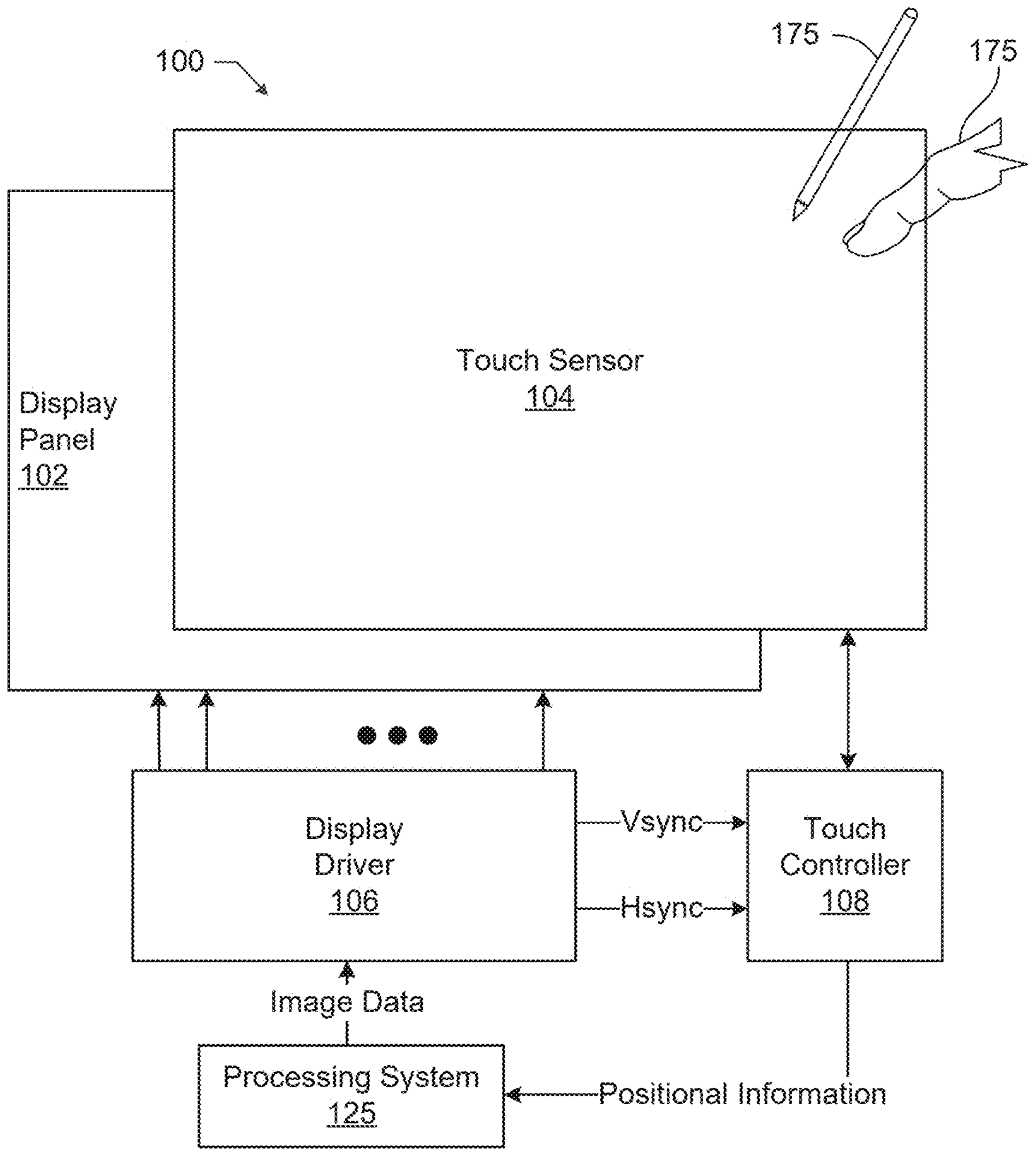
FIG. 1 shows an example configuration of an electronic device with a display panel and a touch sensor, according to one or more embodiments.

To facilitate understanding, identical reference numerals have been used, where possible, to designate identical elements that are common to the figures. It is contemplated that elements disclosed in one embodiment may be utilized in other embodiments without specific recitation. Suffixes may be attached to reference numerals for distinguishing identical elements from each other. The drawings referred to herein should not be understood as being drawn to scale unless specifically noted. Also, the drawings are often simplified, and details or components omitted for clarity of presentation and explanation.

DETAILED DESCRIPTION

The following detailed description is exemplary in nature and is not intended to limit the disclosure or the application and uses of the described embodiments. Furthermore, there is no intention to be bound by any expressed or implied theory presented in the preceding technical field, background, summary and brief description of the drawings, or the following detailed description. Numerous specific details are set forth to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Electronic devices often accommodate both touch sensing of an input object, such as a finger, and communication with other components, such as by way of example active pen input. Communication between the electronic device and such other components can interfere with at least certain modes of touch sensing due to, for example, timing dependencies around synchronization signals such as a vertical synchronization (Vsync) signal—the display's synchronization pulse. As an illustrative example, the active pen and electronic device may be configured to communicate via transmitted signals within a predefined period of time following a Vsync pulse also referred to herein as an interference window. If the touch sensing period coincides with the interference window, the active pen communication may interfere with the sensing signals. Such issues cannot always be avoided by timing sensing periods relative to Vsync because Vsync timing cannot always be reliably tracked under high processor loads, e.g., millions of instructions per second (MIPS) or if refresh rates (e.g., 60 Hz, 120 Hz, 240 Hz) are variable, leading to missed or delayed Vsync events.

The systems and methods described herein mitigate interference between a potentially interfering signal and touch sensing by adjusting touch sensing scan order. For example, when a touch sensor uses a first touch sensing mode, which is not subject to interference, and a second mode, which is subject to interference, the system and method adjust the order of the first touch sensing mode and the second touch sensing mode when needed to avoid interference.

As an illustrative example, the potentially interfering signal may be an active pen signal. The sensing signals include the first touch sensing mode, e.g., transcapacitive sensing signals, that will not interfere with the active pen signal followed by the second touch sensing mode, e.g., absolute capacitive sensing signals, that will interfere with the active pen signal. The active pen signal may be synchronized with Vsync such that active pen communication occurs with a predetermined period after Vsync. The method and system determine timing of the next Vsync signal and next period during which active pen communication may occur. If the active pen communication may occur during a subsequent second touch sensing mode, the system and method dynamically reorder the sensing sequence to perform the second sensing mode before the first sensing mode, thereby avoiding interference. Otherwise, the system and method default to the standard sequence, e.g., first sensing mode before the second sensing mode. This adaptive approach allows consistent touch performance without relying on Vsync timing, enabling high accuracy in devices with variable refresh rates, heavy processing loads, and complex input scenarios thereby enhancing user experience and device reliability. In certain embodiments, a dedicated Vsync detection thread is used to continuously timestamp Vsync signals to facilitate determination of when reordering of sensing modes is appropriate.

Figure 2:
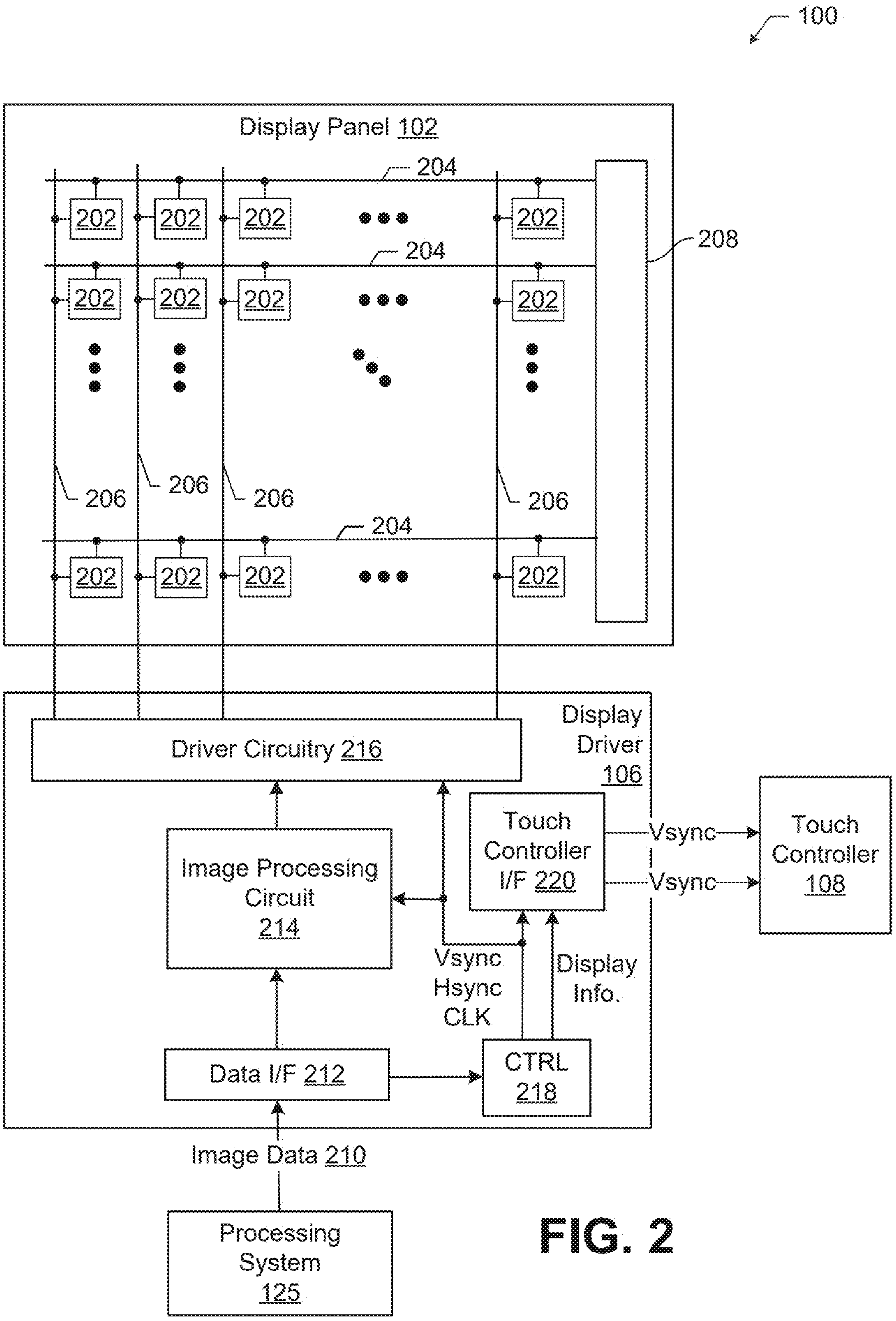
FIG. 2 shows an example configuration of a display panel and associated control circuitry, according to one or more embodiments.
Figure 3:
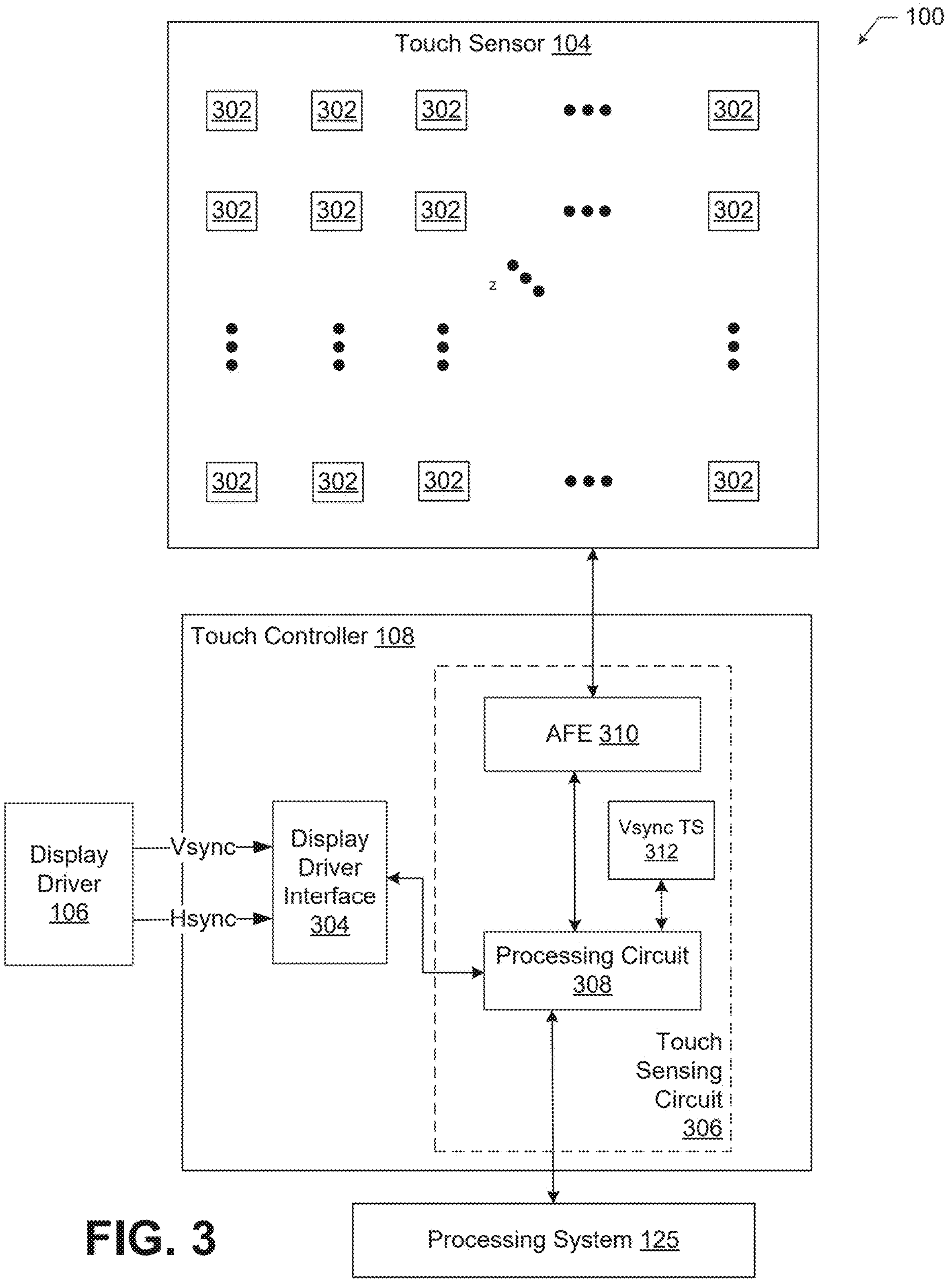
FIG. 3 shows an example configuration of a touch sensor and associated control circuitry, according to one or more embodiments.

FIG. 1 through FIG. 3 generally illustrate an example of an operating environment where the embodiments described herein may be implemented. It will be understood that the operating environment is described by way of an example of an electronic device with a display and touch sensor, which environment is not intended to limit the scope of embodiments described herein. Embodiments include any operating environment using multi-mode touch sensing signals that may be subject to interference by other system signals.

Turning to FIG. 1, a diagram of an example of electronic device 100 or system in accordance with one or more embodiments is shown. The electronic device 100 is configured for displaying images and touch sensing, also referred to as proximity sensing. The term "electronic device" or "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other examples include mobile devices (e.g., cellular phones) and automotive user interfaces configured to give drivers user interface capabilities.

The electronic device 100 may include a display panel 102 and a proximity sensing panel (referred to as touch sensor 104) having sensor electrodes disposed near or integrated in the display panel 102. The electronic device 100 may be configured to display an image on the display panel 102 while sensing one or more input objects located on or near the touch sensor 104 based on resulting signals received from the sensor electrodes.

The electronic device 100 includes a display driver 106 and a touch controller 108. The display panel 102 is coupled to the display driver 106, and the touch sensor 104 is coupled to the touch controller 108. The display driver 106 and the touch controller 108 are further coupled to a processing system 125. Examples of the processing system 125 include an application processor, a central processing unit (CPU), microcontroller, a graphics processing unit (GPU), a special purpose processor, and other types of processors. Although shown skewed in FIG. 1, touch sensor 104 is disposed proximal or integrated in the display panel 102.

It will be understood that the display driver 106, the touch controller 108 and the processing system 125 may be separate circuits or may be integrated into a single circuit. In certain embodiments the display driver 106, the touch controller and/or the processing system 125 may be integrated in whole or in part into one or more integrated circuits (ICs) or may be a single IC.

The touch sensor 104 corresponds to a sensing region where input objects may be detected. The sensing region of the electronic device 100 encompasses any space above, around, in and/or near the electronic device 100 in which the electronic device 100 is able to detect user input, e.g., user input provided by one or more input objects 175, or is able to detect other conditions One type of input object is a stylus 175 (e.g., active pen). The active pen 175 communicates with the electronic device 100 via signals. In some embodiments, the active pen 175 transmits signals responsive to detecting a beacon signal or other signals from the electronic device 100. In certain embodiments, the active pen 175 operates in connection with the touch sensor 104. In other embodiments, the active pen may use electromagnetic resonance (EMR) technology by way of an electromagnetic field generated by a sensor beneath the display.

Another type of input object is one or more fingers 175 or other object.

FIG. 2 shows an example configuration of the display panel 102, according to one or more embodiments. The display panel 102 may be any type of display capable of displaying a an image to a user. Examples of the display panel 102 include, for example, organic light emitting diode (OLED) display panels, micro light emitting diode (LED) display panels and liquid crystal display (LCD) panels.

The display panel 102 includes display elements 202 (e.g., pixel circuits), gate lines 204 (also referred to as scan lines), source lines 206 (also referred to as data lines), and a gate scan driver 208. Each display element 202 may include an OLED pixel, a micro LED pixel, an LCD pixel, or a different type of pixel. Each display element 202 may comprise subpixels, for example, when color images will be displayed. Each display element 202 is coupled to the corresponding gate line 204 and source line 206. The source lines 206 may be configured to provide data voltages to display elements 202 of the display panel 102 to update (or program) the display elements 202 with the data voltages. The gate lines 204 are used to select rows of display elements 202 to be updated with the data voltages. Thus, when display elements 202 of a selected row are updated, the gate scan driver 208 asserts the gate line 204 coupled to the display elements 202 of the selected row.

The display panel 102 may further include other components and signal lines depending on the display technology. In embodiments where an OLED display panel is used as the display panel 102, for example, the display panel 102 may further include emission lines that control light emission of the display elements 202 and power lines that deliver a power supply voltage to the respective display elements 202.

The display driver 106 is configured to drive the source lines 206 of the display panel 102 based on image data 210 received from the processing system 125. The image data 210 corresponds to an image to be displayed on the display panel 102. The image data 210 may include gray levels of the respective display elements 202 of the display panel 102. The display driver 106 is configured to generate data voltages for the respective display elements 202 based on the image data received from the processing system 125 and provide the generated data voltages to the respective display elements 202 via the source lines 206. In certain embodiments, the display driver 106 includes a data interface (I/F) 212, an image processing circuit 214, driver circuitry 216, a controller (CTRL) 218, and a touch controller interface (I/F) 220.

The display driver 106 is configured to update the display elements 202 to update an image displayed on the display panel 102 during display frames. The display frames may be updated, or refreshed, at any appropriate interval, e.g., once about every 16 ms, generating a display refresh rate of about 60 Hz. In other embodiments, other display refresh rates may be employed. For example, the display refresh rate may be 90 Hz, 120 Hz, 140 Hz, or greater.

The data interface 212 is configured to receive image data 210 from the processing system 125 and forward the image data 210 to the image processing circuit 214. The image processing circuit 214 may be configured to perform image processing to adjust the image, such as adjust luminance of individual pixels (or subpixels) in the image data to account for information about the pixel circuits and the display panel. The driver circuitry 216 is configured to drive the source lines 206 based on the processed image data from the image processing circuit 214.

The controller 218 is configured to receive configuration information from the processing system 125 via the data interface 212. For example, the configuration information may include the image refresh rate that identifies the rate at which the display is to be updated in accordance with one or more embodiments. The controller 218 may be configured to output a Vsync signal, horizontal synchronization (Hsync), and a clock (CLK) signal. The Vsync signal is a trigger for the start of each Vsync period. The Hsync signal is a trigger for the start of each Hsync period. The image processing circuit 214, driver circuitry 216, and touch controller interface (I/F) 220 receive the Vsync, Hsync, and clock signal.

The touch controller interface 220 is an interface that is connected to the touch controller 108 and is configured to transmit information such as information corresponding to Vsync, and in some embodiments Hsync, to the touch controller 108. For example, the Vsync link is a connection that transmits the Vsync signal and, if applicable, an Hsync link is a connection that transmits the Hsync signal.

FIG. 3 shows an input portion also referred to as a user interface of an electronic device 100. The input portion includes the touch sensor 104 and the touch controller 108.

The touch sensor 104 includes an array of sensor electrodes 302 disposed proximate to or integrated within the display panel 102. The sensor electrodes 302 are used for proximity sensing to detect one or more input objects located in a sensing area or region, e.g., on or near the touch sensor 104. As used herein, proximity sensing includes touch sensing (e.g., contact on, or proximity to, the touch sensor 104 and/or the display panel 102). Examples of input objects include user's fingers and in some embodiments styli such as a pen. While only a limited number of sensor electrodes 302 are shown in FIG. 3, the touch sensor 104 may include any suitable number of sensor electrodes 302 depending on the size of the touch sensor 104 and desired sensing resolution. Further, while FIG. 3 shows the sensor electrodes 302 are rectangular, the sensor electrodes 302 may have any suitable shape, such as triangular, square, rhombic, hexagonal, irregular, or other shapes. Further, sensor electrodes may be configured in a variety of different configuration patterns, including, e.g., bars and stripes that span vertically and/or horizontally across the panel. An example of such a configuration is rows of receiver electrodes and columns of transmitter electrodes or vice versa.

The touch controller 108 is configured to sense one or more input objects based on resulting signals received from the sensor electrodes 302 and generate positional information of the one or more sensed input objects. "Positional information" as used herein broadly encompasses absolute position, relative position, velocity, acceleration, and other types of spatial information. Historical data regarding one or more types of positional information may also be determined and/or stored, including, for example, historical data that tracks position, motion, gestures, or instantaneous velocity over time. The generated positional information is sent to the processing system 125.

The touch controller 108 may drive the sensor electrodes 302 in various modes. In some modes, the touch controller 108 may utilize all sensor electrodes 105 to detect an input object. In other modes, the touch controller 108 may only utilize a subset of the sensor electrodes 302 to detect an input object.

In certain embodiments or modes, the touch controller 108 drives a first one or more of the sensor electrodes 302 (transmitter electrodes) with a transcapacitive sensing signal and receives a resulting signal with a second one or more of the sensor electrodes 302 (receiver electrodes) to operate the sensor electrodes 302 for transcapacitive sensing. Operating the sensor electrodes 302 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 175) coupled to a system ground approaches the sensor electrodes. Driving the sensor electrodes 302 with transcapacitive sensing signals comprises modulating the sensor electrodes 302 relative to a reference voltage, e.g., system ground.

Transcapacitive sensing can be parallel or non-parallel. Non-parallel transcapacitive sensing may include driving transmitter electrodes of one orientation (e.g., rows or columns) of the sensor electrodes 302 with a transcapacitive sensing signal and reading electrodes of another orientation (e.g., columns or rows) of the sensor electrodes 302 to obtain resulting signals and/or vice versa. Parallel transcapacitive sensing may include driving transmitter electrodes of one orientation (certain rows or columns) of the sensor electrodes 302 with a transcapacitive sensing signal and reading other electrodes of the same orientation (other rows or columns) to obtain resulting signals.

The transcapacitive sensing signal is a periodic or aperiodic signal that varies between two or more voltages. Further, the transcapacitive sensing signal typically has a frequency between 50 kHz and 1 MHz, but in other embodiments other frequencies may be utilized. The transcapacitive sensing signal may have a peak-to-peak amplitude in a range of about 1 V to about 10 V. However, in other embodiments, the transcapacitive sensing signal may have a peak-to-peak amplitude greater than about 10 V or less than about 1 V. Additionally, the transcapacitive sensing signal may have a square waveform, a sinusoidal waveform, triangular waveform, a trapezoidal waveform, or a sawtooth waveform, among others.

In other embodiments or modes, the touch controller 108 operates the sensor electrodes 302 for absolute capacitive sensing by driving a first one or more of the sensor electrodes 302 with an absolute capacitive sensing signal and receiving a resulting signal with the driven sensor electrodes. Operating the sensor electrodes 302 for absolute capacitive sensing detects changes in capacitive coupling between sensor electrodes driven with an absolute capacitive sensing signal and an input object (e.g., the input object 175). The capacitive coupling of the sensor electrodes 302 driven with the absolute capacitive sensing signal is altered when an input object (e.g., the input object 175) coupled to a system ground approaches the sensor electrodes.

The absolute capacitive sensing signal is a periodic or aperiodic signal that varies between two or more voltages. Further, the absolute capacitive sensing signal typically has a frequency between about 50 KHz and about 1 MHZ, but in other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have a peak-to-peak amplitude greater than about 10 V or less than about 1 V. In various embodiments, driving the sensor electrodes 302 with an absolute capacitive sensing signal comprises modulating the sensor electrodes 302. A resulting signal received while performing absolute capacitive sensing may comprise effect (s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitance sensing.

The touch controller 108 may drive the sensor electrodes 302 in multiple modes. For example, the touch controller may drive the sensor electrodes 105 in a transcapacitive mode during a first time period and an absolute capacitive mode during a second time period or vice versa.

The touch controller 108 includes a display driver interface 304 connected to a touch sensing circuit 306. In one or more embodiments, the display driver interface 304 is an interface that is connected to the Vsync link and Hsync link from the display driver 106. The display driver interface 304 is configured to communicate with a processing circuit 308 in the touch sensing circuit 306. In one or more embodiments, the touch sensing circuit 306 includes an analog front end (AFE) 310 and the processing circuit 308. AFE 310 is configured to receive resulting signals from the sensor electrodes 302 and generate analog-to-digital conversion (ADC) data corresponding to the resulting signals. Generating the ADC data may include conditioning (filtering, baseline compensation, and/or other analog processing) of the resulting signals and analog-to-digital conversion of the conditioned resulting signals. The AFE 310 may also be configured to provide transmitter signals to the sensor electrodes 302 (transmitter electrodes).

The processing circuit 308 monitors Vsync using, for example, a thread. Characteristics concerning Vsync, such as frequency, may be stored in a register or memory 312 along with a timestamp. In accordance with embodiments described herein, the characteristics allow the processing circuit to determine when Vsync signals will occur and consequently when communication with devices or components synchronized with Vsync. The monitoring of Vsync allows the processing circuit to determine periods of time when sensing signals may be subject to interference and hence when modifying scan order is appropriate. As previously described, the display rate and hence Vsync frequency may be variable over time.

The processing circuit 308 is configured to process the resulting signals and determine presence of an input object. The processing circuit 308 is configured to generate positional information of one or more input objects in the sensing region based on the resulting signals acquired from the sensor electrodes 302. In one implementation, the processing circuit 308 may be configured to process the ADC data, which correspond to the resulting signals acquired from the sensor electrodes 302, to generate the positional information. The processing circuit 308 may include a processor, such as a micro control unit (MCU), a central processing unit (CPU) and other types of processors, and firmware. The processing circuit 308 may be further configured to control the overall operation of the touch controller 108. Although not shown, the processing circuit 308 may be communicatively coupled to volatile or non-volatile memory for storing executable instructions for carry out methods described herein or for storing data relating to touch sensing and/or Vsync information according to the description that follows.

The electronic device 100 is further configured to operate with an input object that is a pen or active pen. Certain pens use an electro-magnetic field that is generated by the electromagnetic resonance (EMR) sensor under the display. Other pens may use capacitive technology that use a capacitive touch sensor, such as touch sensor 104.

Communication with the electronic device 100 may in certain instances involve a synchronization signal, e.g., beacon signal, from the sensor electrodes 302 or separate component of the electronic device 100. At least certain communication between the pen or active pen and the electronic device 100 may occur at a defined rate, such as once every 16.6 milliseconds (ms), which may be synchronized with certain system signals such as Vsync. In certain embodiments, communication between the pen or other system component and the electronic device 100 may interfere with certain touch sensing modes while not interfering with other touch sensing modes. By way of illustration, communication between the pen or active pen and electronic device 100 may interfere with concurrent or overlapping absolute capacitive sensing signals while not interfering with concurrent or overlapping transcapacitive sensing signals or vice versa.

A "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or multiple of the display frame rate. The capacitive frame rate may be a rational fraction of the display rate (e.g., ½, ⅔, 1, 3/2, 2). In one or more embodiments, the display frame rate may change while the capacitive frame rate remains constant. In other embodiment, the display frame rate may remain constant while the capacitive frame rate is increased or decreased.

In one or more embodiments, capacitive sensing (or input sensing) and display updating may occur during at least partially overlapping periods. For example, the touch controller 108 is configured to operate the sensor electrodes 302 for capacitive sensing while the display driver 106 operates the gate lines 204 and source lines 206 to update an image displayed by the display panel 102. For example, updating the display panel 102 and operating the sensor electrodes 302 for capacitive sensing may be asynchronous with each other.

In one or more embodiments, updating the display panel 102 and operating the sensor electrodes 302 for capacitive sensing may occur during non-overlapping periods. For example, updating the display panel 102 may occur during display update periods and operating the sensor electrodes 302 for capacitive sensing may occur during non-display update periods. The non-display update periods may be a blanking period that occurs between the last line of a display frame and the first line of the following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

Figure 4A:
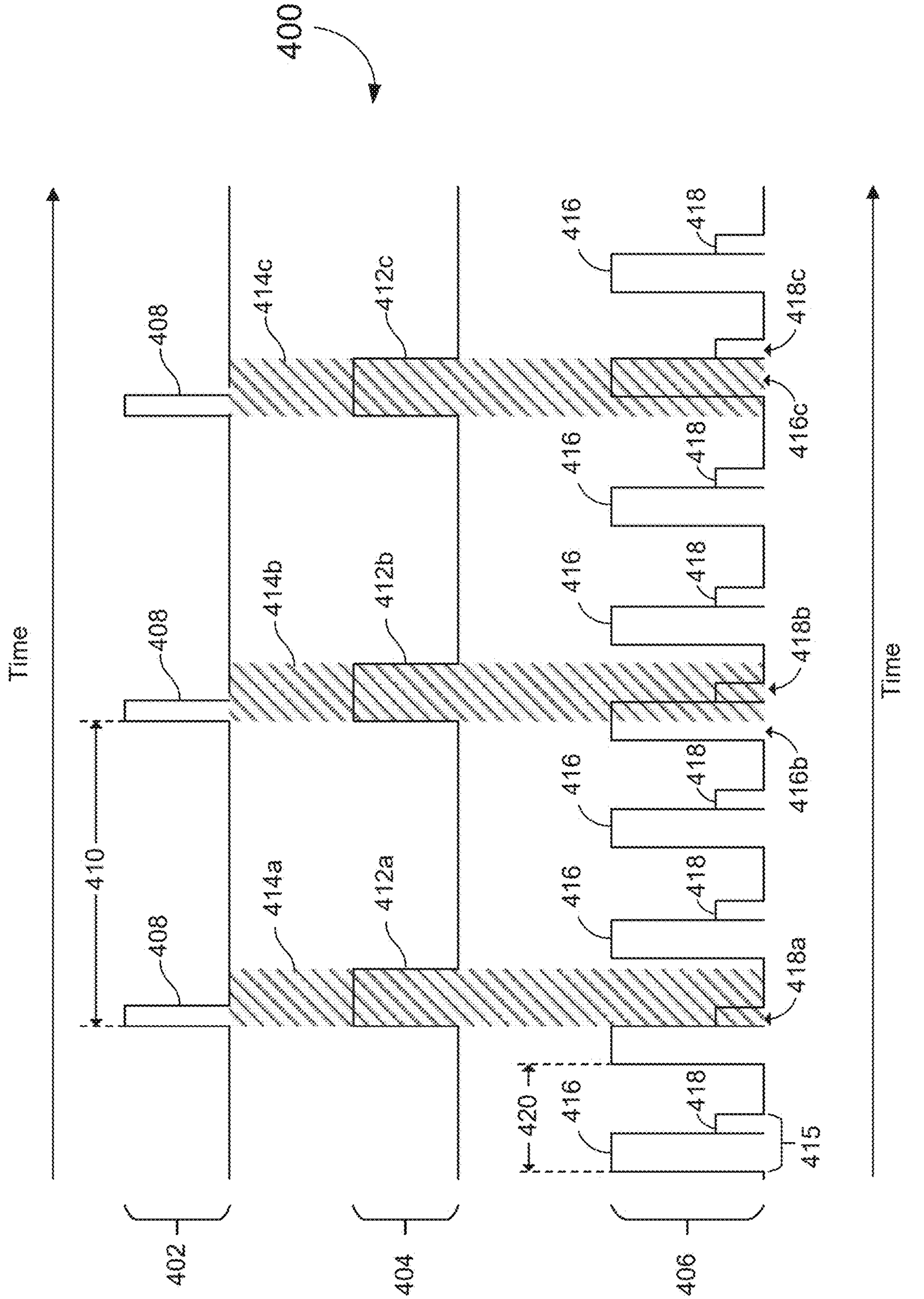
FIG. 4A shows an example of a timing diagram of various signals, according to one or more embodiments.

FIG. 4A shows a timing diagram 400 illustrating an example of relative timing of Vsync signals 408, interference signals 412, and sensing signals 415 of an electronic device with a display panel 102 and a touch sensor 104.

Vsync signal timing diagram 402 shows the Vsync signals 408 with a Vsync period 410. An example of a Vsync period 410 is 16.6 milliseconds (ms) which corresponds to a frequency of 60 Hertz (Hz). It will be understood that any suitable Vsync frequency may be used. Other examples of typical Vsync frequencies include 240 Hz, 120 Hz, 30 Hz, 20 Hz, 15 Hz, 10 Hz, 1 Hz, etc. The Vsync signal 408 is transmitted from the controller 218 to the image processing circuit 214 to trigger the Vsync period 410 on the display driver 106.

In certain embodiments herein, the Vsync signal 408 and/or information regarding Vsync (e.g., frequency) is further transmitted to the touch controller interface 220. The touch controller interface 220 sends the Vsync signal and/or information regarding Vsync to the touch controller 108 where, for example, a dedicated thread is used track Vsync with, for example, a timestamp. Using a thread to track Vsync facilitates accurate monitoring without losing track of Vsync during heavy load conditions such as when a comparatively large amount of touches occur near the touch sensor 104 or when the system otherwise has a high processing load.

Interference signal timing diagram 404 shows interference signals 412, which correspond to signals that can potentially interfere with at least certain of sensing signals 415. A non-limiting example of an interference signal 412 is communication with a pen, although it would be understood that communication with any components within or external to the electronic device 100 may create the interference signals 412.

In the example shown, the interference signal is synchronized with Vsync such that if present, the interference signal 412 will occur within a predetermined time following a Vsync signal 408 (pulsc). For example, the timing may be such that an interference signal 412 will occur within 1.6 ms of the Vsync signal 408. Although the interference signals 412 are shown as a single pulses, each pulse may be a series of higher frequency signals. Shaded areas in the timing diagram 400 depict a projection 414 of the time period during which the interference signals 412 may occur onto a sensing signal timing diagram 406.

The sensing signal timing diagram 406 illustrates the sensing signals 415 with a sensing signal period 420. In the example shown, the sensing signal period 420 is about one third (⅓) of the Vsync period 410 of the Vsync signals 408. For example, if the Vsync period 410 of the Vsync signals 408 is 16.6 ms, the period of sensing signals is 5.53 ms. Thus, in the example, the frequency of the sensing signals 415 is about three (3) times the frequency of the Vsync signals 408, e.g., 180 Hz. Of course, it will be understood that the particular frequencies/periods of the various signals is by way of way of example. The sensing signals 415 may be at the same frequency as the Vsync signals 408 or may be at any higher or lower frequency than the Vsync signals 408.

As previously described, multiple sensing modes may be used. The sensing signal timing diagram 406 reflects two sensing modes that include first sensing signals 416 and second sensing signals 418. By way of example, the first sensing signals 416 may be transcapactive sensing signals and the second sensing signals 418 may be absolute capacitive sensing signals. Although the first sensing signals 416 and the second sensing signals 418 are shown as a series of relatively long pulses, cach pulse (or burst) may be comprised of a series of higher frequency pulses. For purposes of illustrating embodiments described herein, it is assumed that interference signals 412 will interfere with the second sensing signals 418, but will not interfere with the first sensing signals 416 although in embodiments, the interference signals 412 may interfere with the first sensing signals 416, but not interference with the second sensing signals 418. The pattern of sensing signals in FIG. 4A is shown in a default sequence, namely, a first sensing mode that includes the first sensing signals 416 followed by a second mode that includes the second sensing signals 418.

In certain embodiments, the sensing signals 415 are generally asynchronous with the Vsync signals 408 and the interference signals 412. This may occur even when the sensing signals 415 operate at the same frequency as the Vsync signals or an integer multiple thereof. This is illustrated in the example of FIG. 4A where the sensing signals 415 operate at three times the frequency of Vsync signals 408 and the interference signals 412. That is, as shown, for example, the timing of the interference signals 412 does not remain constant relative to the sensing signals 415 as shown by the projection 414 onto the sensing signals 415. The timing the sensing signals 415 and Vsync signals 408 may become skewed for a variety of reasons, such as, during excessive processing due to a large number of touches, e.g., millions of instructions per second (MIPs), or a result of a variable Vsync rate to name but a few examples.

As shown in FIG. 4A, the interference signals 412*a* and 412*b* interfere with second sensing signals 418*a* and 418*b*, respectively, as shown by projections 414*a* and 414*b*. However, interference signal 412*c* does not interference with second signal 418*c*. The remaining second sensing signals 418 in between periods of the interference signals 412 are likewise unaffected. Under the conditions shown in FIG. 4A, touch sensing during second sensing signals 418*a* and 418*b* may be inaccurate or lost due to interference from interference signals 412*a* and 412*b*.

Figure 4B:
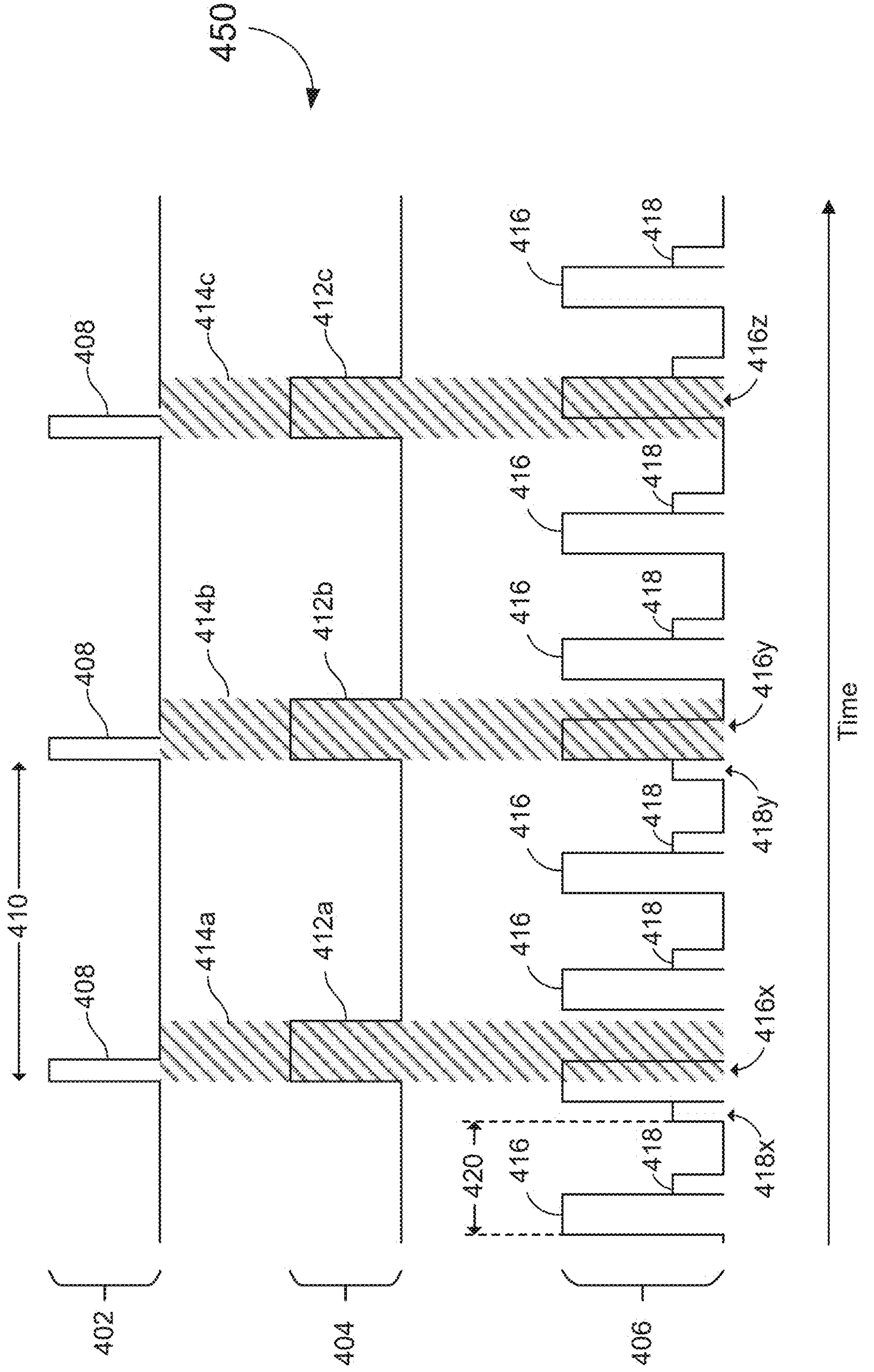
FIG. 4B shows an example of a timing diagram of various signals, according to one or more embodiments.

FIG. 4B shows a timing diagram 450 illustrating an example of relative timing of the Vsync signals 408, the interference signals 412, and the sensing signals 415 of the input device implementing interference avoidance by adjusting touch sensing scan order (sequence) in accordance with certain embodiments herein. For example, the processing circuit 308 receives Vsync signals and/or information concerning Vsync signals via the Vsync link and monitors the frequency and timing of the Vsync signal 408, e.g., using a thread. The processing circuit 308 determines when the next Vsync signal will occur, which also corresponds to the when next interference signal 412 will occur, or at least when the next interference signal 412 may occur. If the next interference signal 412 may interfere with a sensing signals of a sensing mode, the scan order of sensing signals is modified to avoid or mitigate interference.

Similar to FIG. 4A, Vsync signal timing diagram 402 shows the Vsync signals 408 with a Vsync period 410. The Vsync signal 408 is transmitted from the controller 218 to the image processing circuit 214 to trigger a Vsync period on the display driver 106. As in FIG. 4A, the Vsync signal 408 and/or information concerning the Vsync signal 408 is transmitted to the touch controller interface 220, which in turn sends the Vsync signal and/or information concerning the Vsync signal on the Vsync link to the touch controller 108 where a high priority process, such as a dedicated thread, is used track Vsync with, for example, a timestamp.

Interference signal timing diagram 404 shows the interference signals 412, which corresponds to a signal that can potentially interfere with at least certain of sensing signals 415, e.g., communication with an active pen or other external or internal component of the electronic device 100. The interference signal 412 is synchronized with Vsync signals 408 such that, if present, the interference signal occurs within a certain time following a pulse of the Vsync signal 408, e.g., within 1.6 ms.

Sensing signal timing diagram 406 for the sensing signals illustrates sensing signals 415 with a sensing signal period 420, which like FIG. 4A, is about ⅓ the Vsync period 410 or a frequency of about 3 times the frequency of the Vsync signals 408. Of course, as previously described, such timing is provided by way of example only.

As in FIG. 4A, the sensing signal timing diagram 406 depicts two sensing modes that include the first sensing signals 416 and the second sensing signals 418. In the example, the first sensing signals 416 are transcapactive sensing signals and the second sensing signals 418 are absolute capacitive sensing signals. For purposes of illustrating embodiments described herein, it is assumed that interference signals 412 will interfere with the second sensing signals 418 but will not interfere with the first sensing signals 416 although in other embodiments, the interference signals 412 may interfere with the first sensing signals 416, but not the second sensing signals 418. It will further be understood that the embodiments are not limited to any particular number of sensing modes, e.g., may include more than two sensing modes, such as three for or more sensing modes.

The two sensing modes have the default sequence of the first sensing mode followed by the second sensing mode. The default sequence of the sensing signals 415 is modified or altered when interference may occur. For example, as can be seen, the first sensing signal (far left in FIG. 4B) will not be subject to potential interference from interference signals 412 because no projection 414 overlays these sensing signals in the timing diagram 450. Thus, according to embodiments described herein, the sequence follows the standard or default sequence, which in the example is the first sensing signal 416 followed by the second sensing signal 418.

Referring back to FIG. 4A, the second sensing signals 418*a* and 418*b* are subject to potential interference signals 412*a* and 412*b*, respectively, as shown by projections 414. In these instances, the order of the sensing signals 415 is reversed to a modified sequence. For example, as shown in FIG. 4B, second sensing signal 418*x* is sequentially before first sensing signal 416*x*. Likewise, second sensing signal 418*y* is sequentially before first sensing signal 416*y*. As a result of the resequencing, the second signals are no longer subject to potential interference.

It will be noted that with respect to the eighth sensing signal, first sensing 416*z* falls within one of the projections 414; however, in the example, the interference signals 412 are assumed not to interfere with the first sensing signals 416 and hence no further modification of timing is needed. Thus, the default sequence is used.

In an alternative embodiment, when the processing circuit 308 determines interference may occur, the processing circuit 308 disables touch sensing during the potential period of interference, but otherwise maintains consistent timing of touch sensing. For example, with reference to FIG. 4A, second sensing signals 418*a* and 418*b* are disabled.

Figure 5:
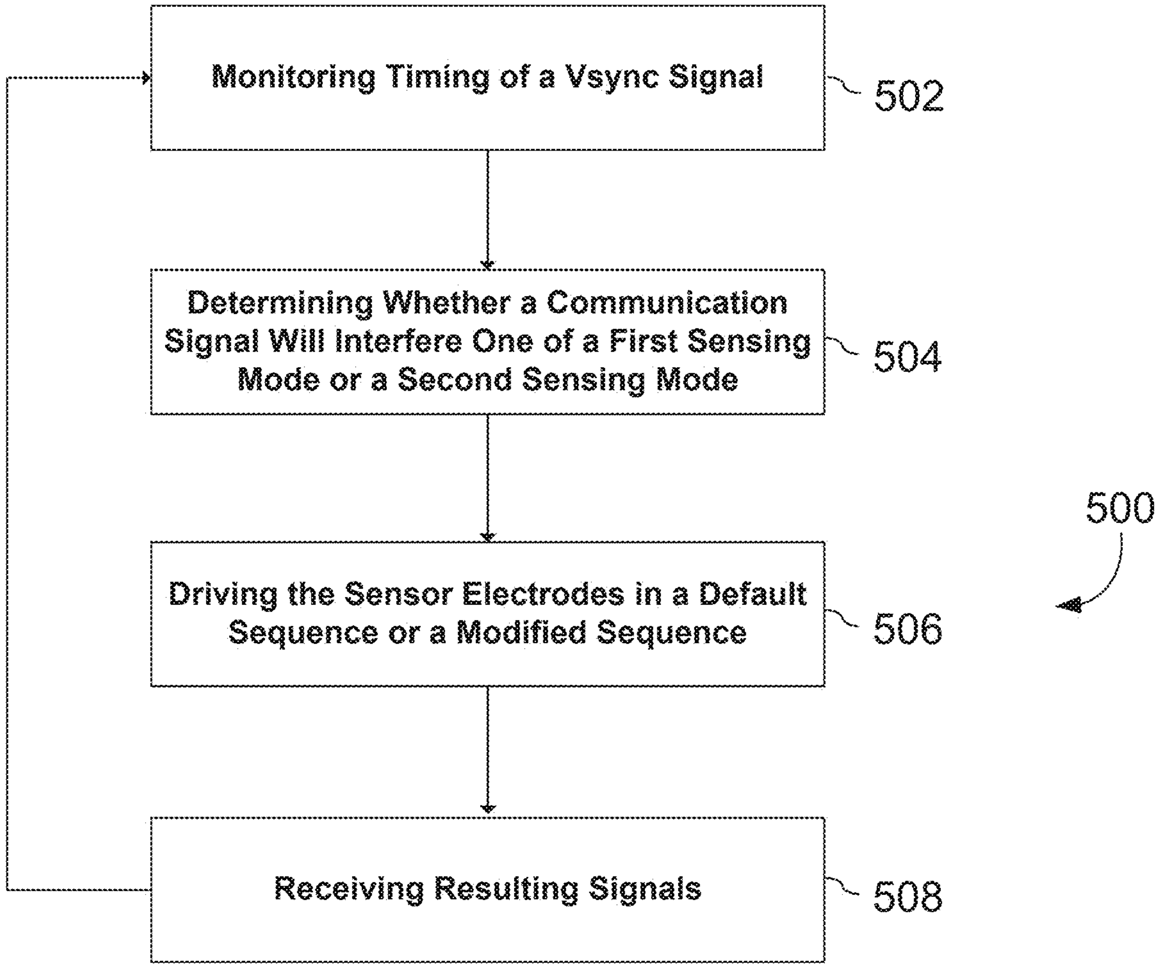
FIG. 5 shows example a method or process for adjusting scan order to mitigate interference, according to one or more embodiments.

FIG. 5 illustrates a method or process 500 for operating a touch sensor based at least in part on display refresh timing signals (e.g., Vsync) to mitigate interference between sensing modes and communication with components synchronized with Vsync.

The method is directed to a system with a display that displays images according to a Vsync signal. The system also includes a plurality of sensing modes during a touch sensing period. For example, the touch sensing period includes multiple sensing modes, e.g., a first sensing mode that is a transcapacitive sensing mode and a second sensing mode that is an absolute sensing mode. The system is configured to communicate with other components such as, by of example, an active pen. Communication signals with such components, e.g., active pen, are synchronized with the Vsync signal such that timing of the communication signal can be determined or predicted based on Vsync. The communication signals may interference with one sensing mode, but not the other sensing mode. For example, the communication signal interferes with the second sensing mode, e.g., absolute capacitance sensing, but the not the first sensing mode, e.g., transcapacitive sensing.

In accordance with the description that follows, the order of sensing may occur according to a default sequence, where the first sensing mode precedes the second sensing mode. When interference would otherwise occur, the order of sensing may be modified to a modified sequence where the second sensing mode precedes the first sensing mode.

At stage 502, a touch controller 108 (e.g., processing circuit 308) monitors timing of Vsync, e.g., receives data corresponding the timing of the next Vsync signal 408. Information regarding the timing of the Vsync signal may be communicated by a Vsync link from the display driver 106 to the touch controller 108 or from the processing system 125. In some embodiments, a dedicated thread is used to track and monitor Vsync timing, even under high processor loads or variable refresh rates. Timing of the Vsync signal may include a timestamp to facilitate tracking of Vsync.

At stage 504, the processing circuit 308 determines whether a communication signal (interference signal 412)—for example, from an active pen 175—is likely to occur during a subsequent (e.g., the next) touch sensing mode that is subject to interference by the communication signal. For example, whether communication with the active pen will occur during an interference window, e.g., projected timing of the second sensing mode, e.g., absolute capacitive sensing. If the second sensing signal 418 (e.g., absolute capacitive sensing) is scheduled to occur during the interference window, touch sensing data may be corrupted or lost.

If the processing circuit 308 determines that the communication may interfere with the second sensing mode, the modified sensing sequence is applied. For example, the sequence is modified so that the second sensing mode (absolute sensing) occurs before the first sensing mode (transcapactive sensing) while otherwise preserving timing, e.g., sensing signal period 420. This resequencing places the second sensing mode outside of the window of interference thereby mitigating the possibility that sensing signals will be lost or corrupted.

If the processing circuit 308 determines that the communication will not interfere with the second sensing mode, the default sensing sequence is applied. For example, first sensing mode (transcapacitive sensing) occurs before the second sensing mode (absolute sensing).

At stage 506, the processing circuit 308 initiates a touch sensing period with either default sequencing or modified sequencing according to the determination made in stage 504. The dynamic adjustment of touch sensing sequence, also referred to as scan order reversal, enables consistent acquisition of clean, interference-free sensing data. The method also facilitates accurate sensing where Vsync frequency may be variable over time.

At stage 510, the touch controller receives resulting signals, which are then processed as previously described. For example, AFE 310 performs analog-to-digital conversion (ADC) on the resulting signals and forwards the digitized data to the processing circuit 308. The processing circuit analyzes the data to detect the presence, location, and movement of one or more input objects (e.g., fingers or stylus 175) in proximity to the touch sensor 104.

In some alternative embodiments, if it is determined that interference may occur but resequencing is not feasible (e.g., due to timing limitations), the system may temporarily disable sensing during the interference window, preserving synchronization integrity while avoiding corrupted data capture.

The process then returns to stage 502.

This dynamic adaptation of sensing mode sequencing relative to display Vsync timing allows for enhanced touch sensing performance while preserving display integrity, particularly in high-refresh-rate or noise-sensitive applications.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While embodiments been described with respect to a limited number of embodiments, those skilled in the art, having benefit of this disclosure, will appreciate that other embodiments can be devised which do not depart from the scope of the embodiments as disclosed herein. Accordingly, the scope of the embodiments should be limited only by the attached claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing embodiments (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the embodiments unless otherwise claimed. No language in the specification should be construed as indicating any non-claimed element as essential to the practice of the embodiments.

Variations of the described embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, the embodiments include all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

The invention claimed is:

1. A touch sensor having a sensing region, comprising:
a plurality of sensor electrodes; and
a touch controller configured to:
drive a first subset of the plurality of sensor electrodes for sensing in a plurality of sequences comprising:
a default sequence comprising a first sensing mode and a second sensing mode, wherein the first sensing mode precedes the second sensing mode and wherein the first sensing mode and the second sensing mode are different touch sensing modes for sensing an input object in the sensing region;
a modified sequence comprising the first sensing mode and the second sensing mode, wherein the second sensing mode precedes the first sensing mode;
monitor timing of a vertical synchronization (Vsync) signal;
determine that communication with a system component interferes with one of the first sensing mode or the second sensing mode based on the timing of the Vsync signal;
drive the sensor electrodes in the modified sequence based on the determination that the communication with the system component interferes with one of the first sensing mode or the second sensing mode; and
receive resulting signals from a second subset of the plurality of sensor electrodes.

2. The touch sensor according to claim 1, wherein the first sensing mode includes a transcapacitive sensing signal and the second sensing mode includes an absolute capacitive sensing signal.

3. The touch sensor according to claim 1, wherein the system component comprises an active pen.

4. The touch sensor according to claim 1, wherein the touch controller monitors the timing of the Vsync signal with a thread.

5. The touch sensor according to claim 4, wherein the touch controller further monitors the Vsync signal with a timestamp.

6. The touch sensor according to claim 1, wherein the touch controller is further configured to:
determine that the communication with the system component does not interfere with one of the first sensing mode or the second sensing mode based on the timing of the Vsync signal; and
drive the sensor electrodes in the default sequence.

7. The touch sensor according to claim 1, wherein the timing of the Vsync signal is variable over time.

8. An input device comprising:
a display configured to display frames according to a vertical synchronization (Vsync) signal;
a plurality of sensor electrodes; and
a touch controller configured to:
drive a first subset of the plurality of sensor electrodes for sensing in a plurality of sequences comprising:
a default sequence comprising a first sensing mode and a second sensing mode, wherein the first sensing mode precedes the second sensing mode and wherein the first sensing mode and the second sensing mode are different touch sensing modes for sensing an input object in a sensing region;
a modified sequence comprising the first sensing mode and the second sensing mode, wherein the second sensing mode precedes the first sensing mode;
monitor timing of the Vsync signal;
determine that communication with a system component interferes with one of the first sensing mode or the second sensing mode based on the timing of the Vsync signal;
drive the sensor electrodes in the modified sequence based on the determination that the communication with the system component interferes with one of the first sensing mode or the second sensing mode; and
receive resulting signals from a second subset of the plurality of sensor electrodes.

9. The input device according to claim 8, wherein the first sensing mode includes a transcapacitive sensing signal and the second sensing mode includes an absolute capacitive sensing signal.

10. The input device according to claim 8, wherein the system component comprises an active pen.

11. The input device according to claim 8, wherein the touch controller monitors the timing of the Vsync signal with a thread.

12. The input device according to claim 11, wherein the touch controller further monitors the Vsync signal with a timestamp.

13. The input device according to claim 8, wherein the touch controller is further configured to:
determine that the communication with the system component does not interfere with one of the first sensing mode or the second sensing mode based on the timing of the Vsync signal; and
drive the sensor electrodes in the default sequence.

14. The input device according to claim 8, wherein the timing of the Vsync signal is variable over time.

15. A method for capacitive sensing, comprising:
driving a first subset of sensor electrodes for sensing in a plurality of sequences, the plurality of sequences comprising:
a default sequence comprising a first sensing mode and a second sensing mode, wherein the first sensing mode precedes the second sensing mode and wherein the first sensing mode and the second sensing mode are different touch sensing modes for sensing an input object in a sensing region;
a modified sequence comprising the first sensing mode and the second sensing mode, wherein the second sensing mode precedes the first sensing mode;
monitoring timing of a vertical synchronization (Vsync) signal;
determining that communication with a system component interferes with one of the first sensing mode or the second sensing mode based on the timing of the Vsync signal;
driving the sensor electrodes in the modified sequence based on the determination that the communication with the system component interferes with one of the first sensing mode or the second sensing mode; and receiving resulting signals from a second subset of electrodes.

16. The method according to claim 15, wherein the first sensing mode includes a transcapacitive sensing signal and the second sensing mode includes an absolute capacitive sensing signal.

17. The method according to claim 15, further comprising:

monitoring the timing of the Vsync signal with a thread.

18. The method according to claim 17, wherein the Vsync signal is monitored using a timestamp.

19. The method according to claim 15, further comprising:

determining that the communication with the system component does not interfere with one of the first sensing mode or the second sensing mode based on the timing of the Vsync signal; and driving the sensor electrodes in the default sequence.

20. The method according to claim 15, wherein the timing of the Vsync signal is variable over time.

* * * * *